United States Patent [19]

Chen et al.

[11] 4,175,071

[45] Nov. 20, 1979

[54] TITANIUM DIOXIDE AS A U.V. SCREEN IN FIRE RETARDANT VINYL POLYMERS

[75] Inventors: Stephen Y. Chen, Elburn; Thomas M. Quinn, St. Charles, both of Ill.

[73] Assignee: Standard Oil Company, Chicago, Ill.

[21] Appl. No.: 922,543

[22] Filed: Jul. 7, 1978

Related U.S. Application Data

[63] Continuation of Ser. No. 772,109, Feb. 25, 1977, abandoned, which is a continuation of Ser. No. 635,032, Nov. 25, 1975, abandoned.

[51] Int. Cl.$^2$ .......................... C08K 3/22; C08K 5/02
[52] U.S. Cl. .............................. 260/42.44; 260/42.45; 260/42.75 B; 260/42.75 F; 260/42.75 W
[58] Field of Search ...................... 260/42.45, 42.75 F, 260/42.44, 45.75 B, 45.75 W

[56] References Cited

U.S. PATENT DOCUMENTS

| 3,075,944 | 1/1963 | Wick et al. | 260/42.45 |
| 3,714,114 | 1/1973 | Stetanski | 260/42.45 |

OTHER PUBLICATIONS

Encyclopedia of Polymer Science and Technology, vol. 13, pp. 239-240, John Wiley and Sons Inc., 1970.
Encyclopedia of Polymer Science and Technology, vol. 5, pp. 235-236, John Wiley and Sons Inc., 1970.
F. Asinger, Paraffin Chemistry and Technology, pp. 333-339, Pergamom Press Ltd., 1968.
Polymer Engineering and Science, vol. 11, No. 11, pp. 782-787, Nov. 1977.

*Primary Examiner*—James H. Derrington
*Attorney, Agent, or Firm*—Stephen L. Hensley; Arthur G. Gilkes; William T. McClain

[57] ABSTRACT

Titanium dioxide, incorporated into vinyl polymers which contain halogenated organic compounds, screens ultraviolet radiation and thus reduces halogen discoloration.

6 Claims, No Drawings

TITANIUM DIOXIDE AS A U.V. SCREEN IN FIRE RETARDANT VINYL POLYMERS

This is a continuation of application Ser. No. 772,109, filed Feb. 25, 1977, now abandoned, which in turn is a continuation of application Ser. No. 635,032, filed Nov. 25, 1975, now abandoned.

BACKGROUND OF THE INVENTION

This invention relates to retarding discoloration of vinyl polymers containing halogenated organic compounds.

Vinyl polymers can be made fire retardant by the incorporation of halogenated organic compounds. Unfortunately, many halogen compounds are sensitive to ultraviolet (U.V.) radiation in that styrene polymers containing halogen compounds tend to discolor rapidly upon exposure to U.V. radiation. Conventional U.V. stabilizers such as benzotriazole and nickel chelate complexes are ineffective for halogenated organics in vinyl aromatic polymers.

SUMMARY OF THE INVENTION

Our invention is a composition comprising a vinyl polymer containing a halogenated organic compound and an effective amount of titanium dioxide such that discoloration of the composition is retarded.

BRIEF DESCRIPTION OF THE INVENTION

We have found that the incorporation of about 0.5 to 10 wt.% and preferably about 1 to 2 wt.% of titanium dioxide retards discoloring of vinyl polymers containing halogenated organics exposed to U.V. radiation, while generally maintaining any flame retardant properties. Although titanium dioxide is well known as a white pigment, the effect observed in styrene or propylene polymers is not a masking of discoloration but is a screening of U.V. radiation which prevents discoloration associated with halogen dissociation.

The ultraviolet radiation which causes discoloration of vinyl polymers containing halogenated organics includes that short wave-length radiation present in sunlight. Therefore, exposure of such polymeric compositions to sunlight will cause a discoloration, although the effect can be intensified in laboratory tests by the use of U.V. lamps.

Numerous halogenated organic compounds produce flame retardance when incorporated into a vinyl polymer in effective amounts usually from about 2 to 50 wt.%. In many cases, a flame retardant promotor or additive such as antimony trioxide ($Sb_2O_3$) or zinc borate is used in amounts ranging from about 1 to 10 wt.% with the organic halogen compound to promote fire retardance. Suitable halogenated organics include mono- and poly-chlorinated and brominated aliphatic, cycloaliphatic and aromatic hydrocarbons containing up to about 20 carbon atoms. Suitable halogenated compounds can contain one or more other substituents such as (but not limited to) nitro, ester, acid, hydroxyl, ketone, amine, phosphoric acid esters and the like. Examples of various types of halogenated organic compounds are described in U.S. Pat. Nos. 3,892,667 and 3,892,710 both incorporated herein by reference.

The specific halogenated organic compounds which can be used with the invention herein are characterized as those which (1) contain carbon-halogen bonds, and (2) form a discolored product when incorporated into a vinyl polymer and exposed to U.V. radiation.

The vinyl polymers which can be used in this invention include propylene, ethylene, styrene, alpha-methylstyrene, rubber-modified styrene, styrene-acrylonitrile and acrylonitrile-butadiene-styrene polymers and copolymers. Preferably our invention is useful in propylene polymers and styrene polymers including those rubber-modified styrene polymers containing from about 1 to 25% polybutadiene or styrene-butadiene rubbers.

Preferably, U.V. stable compositions of our invention should contain from about 0.5 to 5 wt.% of an antioxidant such as hindered phenols thio and phosphate esters and other compounds recognized as antioxidants. Incorporation of metallic stearates into these compositions is beneficial.

EXAMPLES I–III

In order to test the effectiveness of titanium dioxide as a U.V. screen in styrene polymers, test specimens were prepared by dry blending additives with polystyrene pellets. This mixture was extruded in a one-inch Killion extruder at 400°–450° F. and then mini-injected into 100-mil plagues at 400°–450° F. at 900–1000 psi. These test plaques were exposed in a Carbon Arc Fade-Ometer for various times and the color change (Yellowness Index) was measured by a Gardner AC 10 color meter. The results are presented in Table I. The physical and flame retardance properties of these materials are shown in Table II.

TABLE I

| Example (Run) | Styrene Polymer[1] % | Halogenated Organic[2] % | $Sb_2O_3$ (%) | $TiO_2$ (%) | YELLOWNESS INDEX AFTER U.V. EXPOSURE (Hours) | | | | | | | |
|---|---|---|---|---|---|---|---|---|---|---|---|---|
| | | | | | 0 | 1.8 | 5 | 10 | 20 | 58 | 75 | 118 |
| (A)[3] | 100 | 0 | 0 | 0 | | | | | | | | |
| (B) | 80 | 15 | 5 | 0 | 8.97 | 23.06 | 32.20 | 39.61 | 46.50 | 52.57 | 57.06 | 61.47 |
| I | 79 | 15 | 5 | 1 | 6.90 | 8.41 | 10.74 | 14.72 | 21.31 | 30.08 | 35.62 | 46.58 |
| II | 78 | 15 | 5 | 2 | 6.49 | 6.98 | 7.8 | 10.36 | 14.36 | 21.79 | 26.39 | 36.52 |
| III | 75 | 15 | 5 | 5 | 5.89 | 5.81 | 6.19 | 7.23 | 9.75 | 14.40 | 18.39 | 25.03 |

[1] Rubber-modified styrene polymer containing polybutadiene rubber (Amoco H4RCO)
[2] An equal mixture of Dechlorane 602 (Hooker Chemicals) containing 67.9% Br and Cl and Declorane 604 (Hooker Chemicals) containing 69.4% Cl.
[3] Showed essentially no change in color until 58 hours at which time only a very slight yellow appeared.

TABLE II

| | Control A | Control B | Example I | Example II |
|---|---|---|---|---|
| Flow Rate (g/10 min.) | 3.3 | 8.6 | 9.2 | 9.3 |
| Heat Distortion Temp. (°F.) | 181 | 175 | 169 | 170 |
| Vicat Softening Point (°F.) | 215 | 203 | 201 | 201 |
| Density, Unannealed | 1.00 | 1.15 | 1.16 | 1.19 |
| Izod Impact (¼" bar) | 1.15 | 0.73 | 0.77 | 0.73 |
| Flexural Modulus × $10^3$ | 253 | 278 | 271 | 278 |
| Flexural Strength | 6350 | 6200 | 5700 | 5900 |

TABLE II-continued

|  | Control A | Control B | Example I | Example II |
|---|---|---|---|---|
| Tensile Strength @ Yield | 3370 | 3230 | 3140 | 3229 |
| Tensile Strength @ Break | 3550 | 3100 | 3000 | 3070 |
| % Elongation @ Yield | 2.4 | 2.34 | 2.16 | 2.27 |
| % Elongation @ Break | 27 | 8.08 | 5.91 | 6.76 |
| ASTM D 635 | B | NB | NB | NB |
| UL-94 | SB | SE-0 | SE-0 | SE-0 |
| U.V. Stability | Good | Poor-Fair | Good | Good-Excellent |

EXAMPLES IV-VII

A series of polystyrene plaques were prepared and exposed to a Carbon Arc Fade-Ometer. The yellowness was measured after various exposure times and the results are shown in Table III.

Generally, the examples in which titanium dioxide is incorporated show a resistance to coloration on exposure to U.V. radiation.

Table III

| Example (Run) | Styrene Polymer (%) | Halogenated Organic (%) | $Sb_2O_3$ (%) | $TiO_2$ (%) | Anti-Oxidant (%) | YELLOWNESS INDEX AFTER U.V. EXPOSURE (Hours) | | | | | |
|---|---|---|---|---|---|---|---|---|---|---|---|
| | | | | | | 0 | 8 | 24 | 72 | 168 | 200 |
| (C) | 1 | — | — | — | — | 9.59 | 33.75 | 42.90 | Discontinued | | |
| (D) | 2 | — | — | — | — | 19.77 | 54.91 | 58.39 | Discontinued | | |
| (E) | 81.25[3] | 15[4] | 3.75 | — | — | 11.45 | 48.33 | 56.18 | Discontinued | | |
| (F) | 82[5] | 13[6] | 5 | — | 2[7] | 9.89 | 19.07 | 34.08 | 41.06 | Discontinued | |
| (G) | 80[5] | 13[6] | 5 | — | 2[7] | 6.14 | 8.46 | 17.94 | 45.18 | Discontinued | |
| IV | 79[5] | 13[6] | 5 | 1.0 | 2[7] | 4.61 | 4.42 | 4.98 | 8.71 | 28.37 | 41.18 |
| (H) | 81.25[3] | 15[8] | 3.75 | — | — | 3.85 | 10.46 | 17.13 | 18.92 | 24.36 | 27.24 |
| (J) | 85[3] | 10[9] | 5 | — | — | 10.05 | 53.79 | 61.59 | Discontinued | | |
| V | 99.5[10] | 15[4] | 3.75 | 0.5 | — | 9.36 | 30.31 | 42.20 | Discontinued | | |
| VI | 99[10] | 15[4] | 3.75 | 1.0 | — | 9.23 | 22.35 | 34.36 | 54.48 | Discontinued | |
| VII | 96[10] | 15[4] | 3.75 | 2.0 | — | 9.53 | 15.01 | 23.56 | 47.09 | Discontinued | |
| (K) | 100[5] | — | — | — | — | −0.29 | 0.99 | .55 | 6.34 | 14.78 | 17.84 |

[1]Sinclair Koopers Fire Retardant Polystyrene
[2]Dow Chemicals Fire Retardant Polystyrene
[3]Amoco H4CO rubber-modified polyestyrene
[4]Dechlorane 604
[5]Amoco H4RC2 rubber-modified polystyrene
[6]Cities Service halogenated fire retardant additive BC-26
[7]Argus Chemical Stabilizer Mark 1295
[8]Dechlorane 602
[9]Decabromodiphenyl oxide (Dow Chemicals)
[10]Polybutadiene rubber-modified polystyrene

We claim:

1. A method for producing a flame retardant, discoloration resisting styrene polymer composition comprising incorporating into said composition (1) a flame retarding amount of a halogenated organic compound which contains up to about 20 carbon atoms and forms a discolored product when incorporated into styrene polymers and exposed to ultraviolet radiation, and (2) a discoloration retarding amount of titanium dioxide.

2. The method of claim 1 wherein the discoloration retarding amount of titanium dioxide ranges from about 0.5 to 10 wt. %.

3. The method of claim 2 further comprising incorporating into said composition from about 0.5 to about 5 wt. % of an antioxidant.

4. The method of claim 2 further comprising incorporating into said composition a flame retardant promoter.

5. The method of claim 2 wherein from about 2 to about 50 wt. % of the halogenated organic compound, from about 0.5 to about 5 wt. % of an antioxidant, and from about 1 to about 10 wt. % antimony trioxide are incorporated into the composition.

6. The method of claim 5 wherein the styrene polymer is a rubber-modified styrene polymer.

* * * * *

UNITED STATES PATENT OFFICE
CERTIFICATE OF CORRECTION

Patent No. 4,175,071            Dated July 7, 1978

Inventor(s) Stephen Y. Chen and Thomas M. Quinn

It is certified that error appears in the above-identified patent and that said Letters Patent are hereby corrected as shown below:

| THE PATENT READS: | | | SHOULD READ: | | |
|---|---|---|---|---|---|
| Col | Line | | | | |
| 2 | 38 | "plagues" | " | " | --plaques-- |
| 3 | 5 | "3229" (under Example II) | " | " | --3220-- |
| 3 | 36 | "$96^{10}$" (Table III, Ex. VII) Under Styrene Polymer | " | " | --$98^{10}$-- |
| 4 | 29 | "33.75" (Table III, Run C, under yellow.) | " | " | --35.75-- |
| 4 | 37 | ".55" (Table III, Run K, under yellow.) | " | " | --2.55-- |
| 3 | 38 | "Koopers" | " | " | --Koppers-- |

Signed and Sealed this

Twenty-ninth Day of July 1980

[SEAL]

Attest:

SIDNEY A. DIAMOND

*Attesting Officer*        *Commissioner of Patents and Trademarks*